US008019842B1

(12) United States Patent
Kong et al.

(10) Patent No.: US 8,019,842 B1
(45) Date of Patent: Sep. 13, 2011

(54) SYSTEM AND METHOD FOR DISTRIBUTING ENCLOSURE SERVICES DATA TO COORDINATE SHARED STORAGE

(75) Inventors: George Kong, Santa Clara, CA (US); Anthony F. Aiello, Santa Clara, CA (US); Radek Aster, Campbell, CA (US); Randal Thelen, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 1108 days.

(21) Appl. No.: 11/075,618

(22) Filed: Mar. 8, 2005

Related U.S. Application Data (60) Provisional application No. 60/647,562, filed on Jan. 27, 2005.

(51) Int. Cl.
G06F 15/173 (2006.01)
G06F 7/00 (2006.01)
G06F 13/00 (2006.01)
(52) U.S. Cl. .............................. 709/223; 710/1; 709/230
(58) Field of Classification Search .................. 709/223, 709/230; 711/112; 707/1, 100
See application file for complete search history.

(56) References Cited

U.S. PATENT DOCUMENTS

| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,355,453 A | 10/1994 | Row et al. |
| 5,426,747 A | 6/1995 | Weinreb et al. |
| 5,485,579 A | 1/1996 | Hitz et al. |
| 5,568,629 A | 10/1996 | Gentry et al. |
| 5,581,724 A | 12/1996 | Belsan et al. |

(Continued)

FOREIGN PATENT DOCUMENTS

WO   WO 89/10594   11/1989

OTHER PUBLICATIONS

American National Standards Institute, Inc.; American National Standard for Information Technology; Fibre Channel- Physical and Signaling Interface Inc.;(FC-PH); Nov. 14, 1994.

(Continued)

*Primary Examiner* — William Vaughn, Jr.
*Assistant Examiner* — Muktesh G Gupta
(74) *Attorney, Agent, or Firm* — Cesari and McKenna, LLP (57) ABSTRACT

A system and method for distributing enclosure services information is provided. A plurality of storage systems that are operatively interconnected with one or more intermediate networking devices and/or disk shelves are modified to include a target device driver module that is adapted to receive and process target commands from other storage systems to enable the sharing and retrieval of SES information from a storage shelf's master storage system.

15 Claims, 8 Drawing Sheets

U.S. PATENT DOCUMENTS

| | | | |
|---|---|---|---|
| 5,802,366 | A | 9/1998 | Row et al. |
| 5,819,292 | A | 10/1998 | Hitz et al. |
| 5,835,700 | A * | 11/1998 | Carbonneau et al. ........... 714/44 |
| 5,892,955 | A | 4/1999 | Ofer |
| 5,894,588 | A | 4/1999 | Kawashima et al. |
| 5,931,918 | A | 8/1999 | Row et al. |
| 5,941,972 | A | 8/1999 | Hoese et al. |
| 5,963,962 | A | 10/1999 | Hitz et al. |
| 5,975,738 | A | 11/1999 | DeKoning et al. |
| 6,038,570 | A | 3/2000 | Hitz et al. |
| 6,065,037 | A | 5/2000 | Hitz et al. |
| 6,078,990 | A * | 6/2000 | Frazier .......................... 711/114 |
| 6,128,734 | A | 10/2000 | Gross et al. |
| 6,209,023 | B1 * | 3/2001 | Dimitroff et al. ............. 709/211 |
| 6,425,035 | B2 | 7/2002 | Hoese et al. |
| 6,516,380 | B2 | 2/2003 | Kenchammana-Hoskote et al. |
| 6,594,698 | B1 * | 7/2003 | Chow et al. ................... 709/226 |
| 6,598,174 | B1 * | 7/2003 | Parks et al. ......................... 714/6 |
| 6,629,062 | B2 * | 9/2003 | Coffey et al. ................. 702/188 |
| 6,636,879 | B1 | 10/2003 | Doucette et al. |
| 6,643,654 | B1 | 11/2003 | Patel et al. |
| 6,654,902 | B1 | 11/2003 | Brunelle et al. |
| 6,708,265 | B1 | 3/2004 | Black |
| 6,757,695 | B1 | 6/2004 | Noveck et al. |
| 6,785,742 | B1 * | 8/2004 | Teow et al. ........................ 710/1 |
| 6,976,083 | B1 * | 12/2005 | Baskey et al. ................. 709/223 |
| 6,988,136 | B2 * | 1/2006 | Sicola et al. ................... 709/224 |
| 7,089,293 | B2 * | 8/2006 | Grosner et al. ............... 709/217 |
| 7,107,385 | B2 * | 9/2006 | Rajan et al. ......................... 711/4 |
| 7,117,242 | B2 | 10/2006 | Cherkasova et al. |
| 7,146,522 | B1 | 12/2006 | Rowe et al. |
| 7,194,597 | B2 | 3/2007 | Willis et al. |
| 7,216,188 | B2 * | 5/2007 | Reid et al. ........................ 710/74 |
| 7,260,678 | B1 * | 8/2007 | Agarwal et al. ............... 711/112 |
| 7,260,737 | B1 | 8/2007 | Lent |
| 7,281,072 | B2 * | 10/2007 | Liu et al. ........................ 710/240 |
| 7,296,068 | B1 | 11/2007 | Sarma et al. |
| 7,305,670 | B2 * | 12/2007 | Ogasawara et al. ........... 717/171 |
| 7,325,051 | B2 | 1/2008 | Das et al. |
| 7,366,808 | B2 * | 4/2008 | Kano et al. .................... 710/105 |
| 7,444,396 | B2 * | 10/2008 | King et al. ..................... 709/223 |
| 7,523,286 | B2 | 4/2009 | Ramany et al. |
| 7,593,996 | B2 | 9/2009 | Gole et al. |
| 7,610,295 | B2 * | 10/2009 | Pooni et al. ........................... 1/1 |
| 7,711,683 | B1 * | 5/2010 | Watanabe et al. ...................... 1/1 |
| 2002/0044561 | A1 * | 4/2002 | Coffey .......................... 370/403 |
| 2002/0044562 | A1 * | 4/2002 | Killen et al. ................... 370/406 |
| 2002/0046276 | A1 * | 4/2002 | Coffey et al. ................. 709/224 |
| 2002/0059492 | A1 * | 5/2002 | Sabotta et al. ................ 710/301 |
| 2002/0083120 | A1 | 6/2002 | Soltis |
| 2002/0099914 | A1 | 7/2002 | Matsunami et al. |
| 2002/0133736 | A1 * | 9/2002 | Faber et al. ........................ 714/5 |
| 2002/0156984 | A1 | 10/2002 | Padovano |
| 2003/0061491 | A1 | 3/2003 | Jaskiewicz et al. |
| 2003/0097611 | A1 | 5/2003 | Delaney et al. |
| 2003/0120743 | A1 | 6/2003 | Coatney et al. |
| 2004/0025052 | A1 * | 2/2004 | Dickenson .................... 713/201 |
| 2004/0030668 | A1 | 2/2004 | Pawlowski et al. |
| 2004/0199515 | A1 | 10/2004 | Penny et al. |
| 2004/0199607 | A1 | 10/2004 | Reger et al. |
| 2004/0233910 | A1 * | 11/2004 | Chen et al. .................. 370/395.5 |
| 2005/0138154 | A1 * | 6/2005 | Seto ............................... 709/223 |
| 2005/0246401 | A1 | 11/2005 | Edwards et al. |
| 2006/0206671 | A1 | 9/2006 | Aiello et al. |
| 2007/0050538 | A1 * | 3/2007 | Northcutt et al. ............. 711/112 |
| 2007/0088702 | A1 | 4/2007 | Fridella et al. |

OTHER PUBLICATIONS

American National Standards Institute, Inc.; American National Standard for Information Technology—Fibre Channel Arbitrated Loop (FC-AL-2); Dec. 8, 1999.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "LUN Security Considerations for Storage Area Networks" Hitachi Data Systems, 1999, pp. 1-7, XP002185193.

American National Standards Institute, Inc.; INCITS 305-1998 (R2003) "Information Technology—SCSI-3 Enclosure Services (SES) Command Set".

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981© 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, in Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Hitz, David, et al. *System and Method for Enabling a Storage System to Support Multiple Volume Formats Simultaneously*, USPTO Provisional U.S. Appl. No. 60/652,626. Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

U.S. Appl. No. 60/647,563 entitled "Coordinated Shared Storage Architecture," filed by Anthony Aiello et al., on Jan. 27, 2005.

U.S. Appl. No. 60/647,562 entitled "System and Method for Distributing Enclosure Services Data to Coordinate Shared Storage", filed by Randy Thelen et al., on Jan. 27, 2005.

Reino, B. International Search Report for International Application No. PCT/US2006/002639, Jul. 27, 2006, 5 pages.

SNIA Storage Networking Industry Association; Common Internet File System (CIFS), Version: CIFS-Spec. 0.9. Work Group in Progress. Mar. 26, 2001. 126 pages.

Howard, John H., *An Overview of the Andrew File System*, Carnegie Mellon University, CMU-ITC-88-062, 1988, 6 pages.

*The IBM System/38*, Chapter 8, 1984, pp. 137-157.

Lomet, David., et al., *The performance of a multiversion access method*, ACM Sigmod International Conference on Management of Data, 19:353-365, 1990.

Satyanarayanan, M., et al, *Coda: A highly available file system for a distributed workstation enviroment* Carnegie Mellon University, CMU-ITC, 1990, 5 pages.

Baker, et al., Non-Volatile Memory for Fast, Reliable File Systems, Proceedings of the 5th International Conference on Architectural Support for Programming Languages and Operating Systems, Oct. 1992, 13 pages.

\* cited by examiner

| | |
|---|---|
| MESSAGE | _505_ |
| NEXT COMMAND BLOCK | _510_ |
| PREVIOUS COMMAND BLOCK | _515_ |
| ADAPTER INDEX | _520_ |
| INITIATOR ID | _525_ |
| COMMAND REFERENCE NUMBER | _530_ |
| DATA DIRECTION | _535_ |
| TASK CODE | _540_ |
| COMMAND DESCRIPTOR BLOCK | _545_ |
| LUN | _550_ |
| TARGET ID | _555_ |
| TASK MANAGEMENT FLAGS | _560_ |
| DATA BUFFER | _565_ |
| DATA LENGTH | _570_ |
| TRANSFER LENGTH | _575_ |
| AMOUNT TRANSFERRED | _580_ |
| SCSI STATUS | _585_ |
| RESPONSE CODE | _590_ |
| SENSE DATA | _595_ |
| ⋮ | _597_ |

SYSTEM AND METHOD FOR DISTRIBUTING ENCLOSURE SERVICES DATA TO COORDINATE SHARED STORAGE

RELATED APPLICATIONS

The present application claims the benefit of U.S. Provisional Patent Application Ser. No. 60/647,562, which was filed on Jan. 27, 2005, by Randal Thelen, et al, for a SYSTEM AND METHOD FOR DISTRIBUTING ENCLOSURE SERVICES DATA TO COORDINATE SHARED STORAGE and is hereby incorporated by reference.

The present application is related to U.S. patent application Ser. No. 11/075,619, filed on Mar. 8, 2005, now U.S. Publication No. US2006/020671 on Sep. 14, 2006, entitled COORDINATED SHARED STORAGE ARCHITECTURE, by Anthony Aiello, et al, the contents of which are hereby incorporated by reference.

FIELD OF THE INVENTION

The present invention relates to storage systems and, in particular, to sharing SCSI enclosure services information among storage systems.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client systems (clients) to access shared resources, such as files, stored on the storage system. Sharing of files is a hallmark of a NAS system, which is enabled because of semantic level of access to files and file systems. Storage of information on a NAS system is typically deployed over a computer network comprising of a geographically distributed collection of interconnected to communication links, such as Ethernet, that allow clients to remotely access the information (files) on the file server. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a multi-protocol storage appliance suitable for use in the SAN, is described in U.S. Pat. No. 7,873,700, issued on Jan. 18, 2011, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al.

It is advantageous for the services and data provided by a storage system, such as a storage appliance to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. Pat. No. 7,260,737, issued on Aug. 21, 2007, entitled SYSTEM AND METHOD FOR TRANSPORT-LEVEL FAILOVER OF FCP DEVICES IN A CLUSTER, by Arthur F. Lent, et al. An administrator may desire to take a storage appliance offline for a variety of reasons including, for example, to upgrade hardware, etc. In such situations, it may be advantageous to perform a user-initiated takeover operation, as opposed to a failover operation. After the takeover operation is complete, the storage appliance's data will be serviced by its partner until a give-back operation is performed.

In certain known storage appliance cluster configurations, the transport medium used for communication between clients and the cluster is Fibre Channel (FC) cabling utilizing the FCP protocol (SCSI embedded in FC) for transporting data. In SCSI terminology, clients operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g. World Wide Node Name (WWNN) and World Wide Port Name (WWPN). A Device Identifier unique within a given FC switching fabric and is assigned dynamically to the FC port by a FC switch coupled thereto.

In conventional failover techniques involving clusters of storage appliances, each to storage appliance in the cluster maintains two physical FC ports, namely an A port and a B port. The A port is utilized for processing and handling data access requests directed to the storage appliance. The B port typically is in a standby mode; when a failover situation occurs, the B port is activated and "assumes the identity" of its failed partner storage appliance. At that point, the B port functions as a FC target to receive and handle data access requests directed to the failed storage appliance. In this way, the surviving storage appliance may process requests directed to both the storage appliance and its failed partner storage appliance. Such a conventional FC failover is further described in the above-referenced U.S. Pat. No. 7,260,737, issued on Aug. 21, 2007, entitled SYSTEM AND METHOD FOR TRANSPORT-LEVEL FAILOVER OF FCP DEVICES IN A CLUSTER.

Specifically, the B port of the "surviving" storage appliance upon assuming the identity of its failed partner storage appliance, services data access requests direct to a WWNN and a WWPN of the partner. For many client operating systems, this is sufficient to permit clients to transparently access the surviving storage appliance as if it were the failed storage appliance. That is, the data access requests directed to these unique network address identifiers of the failed storage appliance are received and processed by the surviving storage appliance. Although it may appear to the clients as if the failed storage appliance was momentarily disconnected and reconnected to the network, data operations associated with the data access requests continue to be processed.

Figure 1:
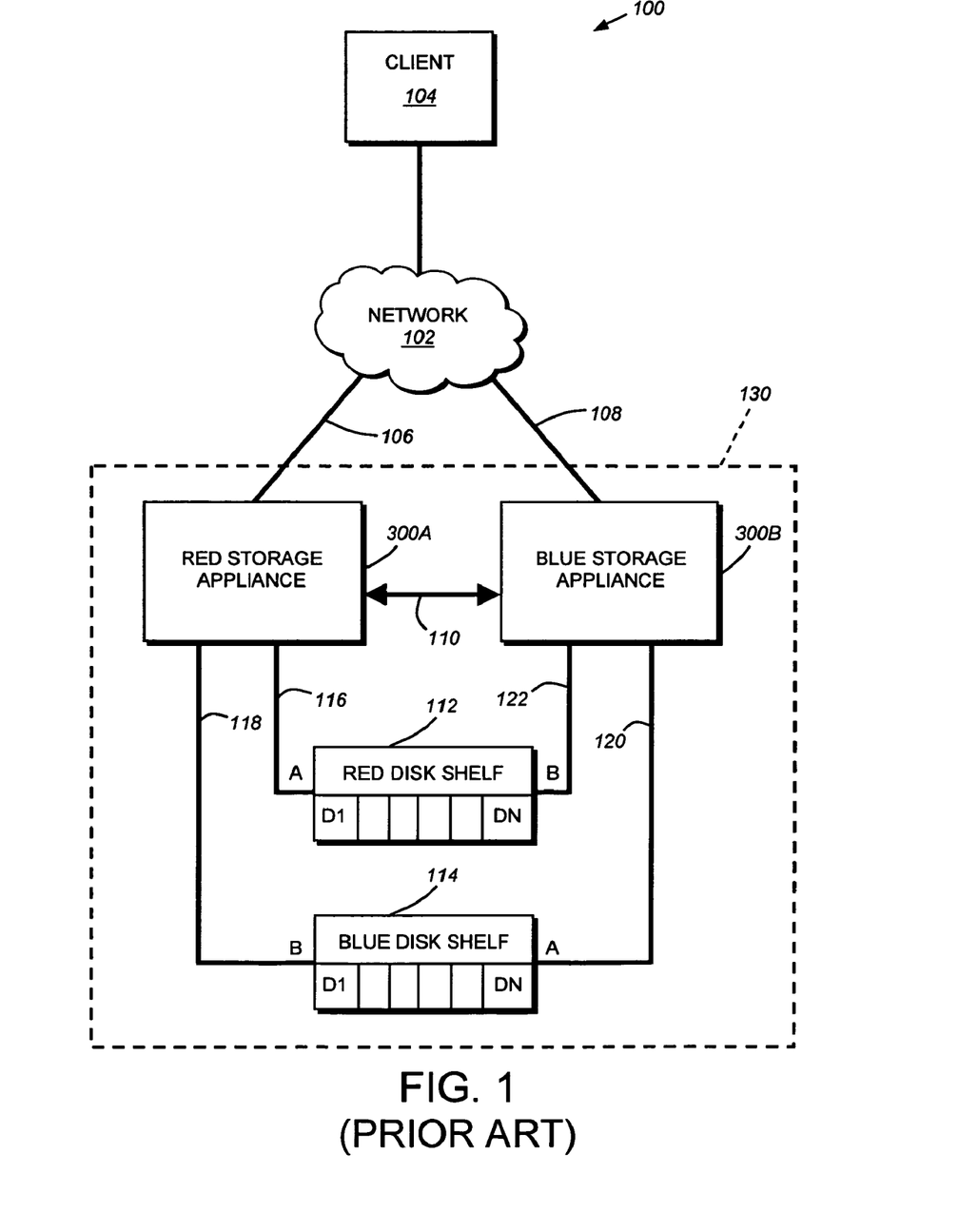
FIG. 1, previously described, is a schematic block diagram of an exemplary in the storage system cluster one.

FIG. 1 is a schematic block diagram of an exemplary storage system network environment 100. The environment 100 comprises a network cloud 102 coupled to a client 104. The client 104 may be a general-purpose computer, such as a PC or a work-station, or a special-purpose computer, such as an application server, configured to execute applications over an operating system that includes block access protocols. A storage system cluster 130, comprising Red Storage System 300A and Blue Storage System 300B, is also connected to the cloud 102. These storage systems, are illustratively embodied as storage appliances configured to control storage of and access to interconnected storage devices, such as disks residing on disk shelves 112 and 114.

In the illustrated example, Red Storage Appliance 300A is connected to Red Disk Shelf 112 by the A port 116. The Red Storage System 300A also accesses Blue Disk Shelf 114 via the B port 118. Likewise, Blue Storage Appliance 300B accesses Blue Disk Shelf 114 via A port 120 and Red Disk Shelf 112 through counterpart B port 122. Thus each disk shelf in the cluster is accessible to each storage appliance, thereby providing redundant data paths in the event of a failover. It should be noted that the Red and Blue disk shelves are shown directly connected to the storage appliances 300 for illustrative purposes only.

Connecting the Red and Blue Storage Appliances 300A, B is a cluster interconnect 110, which provides a direct communication link between the two storage appliances. The cluster interconnect 110 can be of any suitable communication medium, including, for example, an Ethernet connection or a FC data link.

During normal cluster operation, the storage system that is connected to a disk shelf via the disk shelf's primary port is the "owner" of the disk shelf and is primarily responsible for servicing data requests directed to blocks on volumes contained on that disk shelf. Thus, in this example, the Red storage appliance 300A owns the Red Disk Shelf 112 and is primarily responsible for servicing data access requests for blocks contained on that disk shelf. Similarly, the Blue storage appliance 300B is primarily responsible for the Blue disk shelf 114. When operating as storage appliance cluster 130, each storage appliance 300 is typically configured to take over and assume data handling capabilities for the other disk shelf in the cluster 130.

SCSI Enclosure Services (SES) provides a command set for obtaining environmental information relating to disks connected to a disk shelf, such as disk shelves 112, 114. SCSI Enclosure Services is defined in SCSI Enclosure Services-2 (SES-2), published by Committee T-10 on 22 Jul. 2004, the contents of which are hereby incorporated by reference. In some SES environments, each disk shelf contains two disk slots that are designated as SES slots. A storage system that owns a disk in an SES slot (a "SES disk") is a master of that shelf (a "SES master") and is able to retrieve SES environmental information relating to the entire shelf and modify data including, for example, setting a light emitting diode (LED) to signify the status of one or more disks. The use of SES disks in a two storage system cluster environment is advantageous as each of the storage systems typically is the master of a particular shelf. In the example of FIG. 1, the Red Storage Appliance is the SES master of Red Disk Shelf 112, whereas the Blue Storage Appliance is the SES master of the Blue Disk Shelf 114. This results from the Red Storage Appliance typically owning all disks in the Red Disk Shelf and the Blue storage appliance owning all disks in the Blue disk shelf. During a failover situation, when a storage appliance has taken ownership of a disk, the state of being the SES master of the shelf also passes with the ownership of the SES disks. For example, if the Red Storage Appliance fails and the Blue Storage Appliance takes ownership of the disks on Red Disk Shelf 112, the Blue Storage Appliance would become the SES master of the Red Disk Shelf 112.

A noted disadvantage arises in storage system environments having more than two storage systems. In such an environment, a storage system may own a non-SES disk on a disk shelf and not own either of the SES disks on the shelf. As such, the storage system lacks the capability to obtain SES information or to set certain environmental variables, e.g., setting a disk failure LED for the disk that it owns.

SUMMARY OF THE INVENTION

The present invention overcomes the disadvantages of the prior art by providing a system and method for coordinating shared SCSI enclosure services (SES) information among a plurality of storage systems. Storage systems, which are interconnected with a series of intermediate network devices, such as hubs, between the storage systems and disk shelves, include a novel target device driver (TDD) module within a storage operating system. The TDD permits each storage system to function as a SCSI target and thereby receive and process commands directed to it from the other storage systems over the shared back end storage network. In the illustrative embodiment, a plurality of storage systems are operatively interconnected with a plurality of hubs or other intermediate network devices, which are, in turn, operatively interconnected with one or more disk shelves. During system initialization, each storage system determines the shelves for which it is an SES master by first determining the disks it owns, which may be accomplished using conventional disk ownership techniques. If it owns a SES disk, the storage system is one of the SES masters for the shelf containing the disk. The storage system then communicates with the other storage systems using SES messages to determine the SES masters of the other disks shelves on which it owns disks.

Specifically, the TDD facilitates communication with a SES module of the storage operating system to coordinate the SES information among the various storage systems. When requiring information on a disk shelf for which it is not the master, the storage system may transmit an SES message directed to one of the SES masters of the appropriate disk shelf. The SES message is received by the TDD at the SES master storage system, and forwarded to the SES module for processing. Thus, the storage systems may coordinate SES information amongst themselves by sending appropriate messages (requests) to SES masters. In effect, the network interconnecting the storage systems, intermediate network devices and disks is utilized as an N-way interconnect among the storage systems.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

Figure 2:
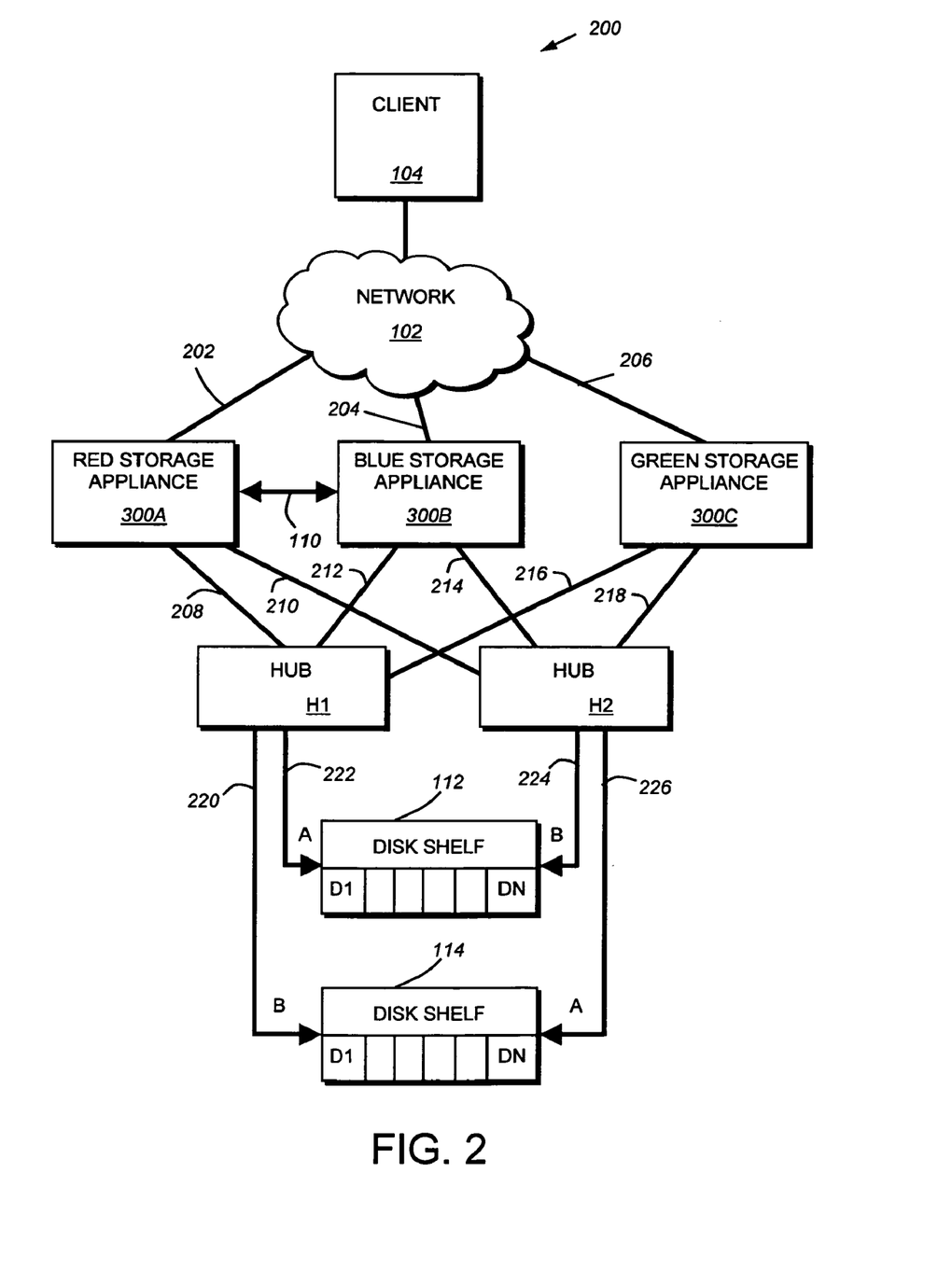
FIG. 2 is a schematic block diagram of an exemplary storage system environment in accordance with an embodiment of the present invention.

FIG. 2 is a schematic block diagram of an exemplary network environment 200 in which the principles of the present invention are implemented. The environment 200 comprises a network cloud 102 coupled to one or more clients 104. The client 104 may be a general-purpose computer, such as a PC or a workstation, or a special-purpose computer, such as an application server, configured to execute applications over an operating system that includes block access protocols. A Red Storage System 300A, Blue Storage System 300B and Green Storage System 300C are also connected to the cloud 102. These storage systems, described further below, are illustratively embodied as storage appliances configured to control storage of and access to interconnected storage devices, such as disks residing on disk shelves 112 and 114.

FIG. 2 is a schematic block diagram of an exemplary network environment 200 in which the principles of the present invention are implemented. The environment 200 comprises a network cloud 102 coupled to one or more clients 104. The client 104 may be a general-purpose computer, such as a PC or a workstation, or a special-purpose computer, such as an application server, configured to execute applications over an operating system that includes block access protocols. Red Storage System 300A, Blue Storage System 300B and Green Storage System 300C are also connected to the cloud 102. These storage systems, described further below, are illustratively embodied as storage appliances configured to control storage of and access to interconnected storage devices, such as disks residing on disk shelves 112 and 114.

The Red, Blue and Green storage systems 300 A, B, C are connected to the network 102 via "front-end" data pathways 202, 204, 206 respectively. These front-end data pathways 202, 204, 206 may comprise direct point-to-point links or may represent alternate data pathways including various intermediate network devices, such as routers, switches, hubs, etc. In addition, exemplary intermediate network devices H1 and H2 are connected to the disk shelves 112 and 114. In the illustrative embodiment, H1 and H2 are interconnected with both the A and B ports of disk shelves 112, 114, thereby providing multiple "back-end" data pathways to both disk shelves. Specifically, H1 connects to disk shelf 112 via its A port 222 and to disk shelf 114 via its B port 220. Similarly, H2 connects to disk shelf 112 via its B port 224 and to disk shelf 114 via its A port 226. It should be noted that such data pathways can be any acceptable networking media including, for example, a Fibre Channel Arbitrated Loop (FC-AL). Red storage system 300 is connected to H1 via "intermediate" data pathway 208 and to H2 via intermediate data pathway 210, while Blue storage system 300B is connected to H1 via intermediate data pathway 212 and to H2 via intermediate data pathway 214. Finally, Green storage system 300C is connected to H1 via intermediate data pathway 216 and to H2 via intermediate data pathway 218.

In the exemplary embodiment, intermediate network devices H1, H2 are embodied as hubs. However, it is expressly contemplated that other types of intermediate network devices, such as switches may be utilized in accordance with alternate embodiments of the present invention. As such, the use of hubs as intermediate network devices should be taken as exemplary only. In accordance with an exemplary embodiment of the present invention, the novel storage network environment 200 permits several techniques to be employed that are directed to, for example, the scalability of storage systems and/or disks.

B. Storage Appliance

Figure 3:
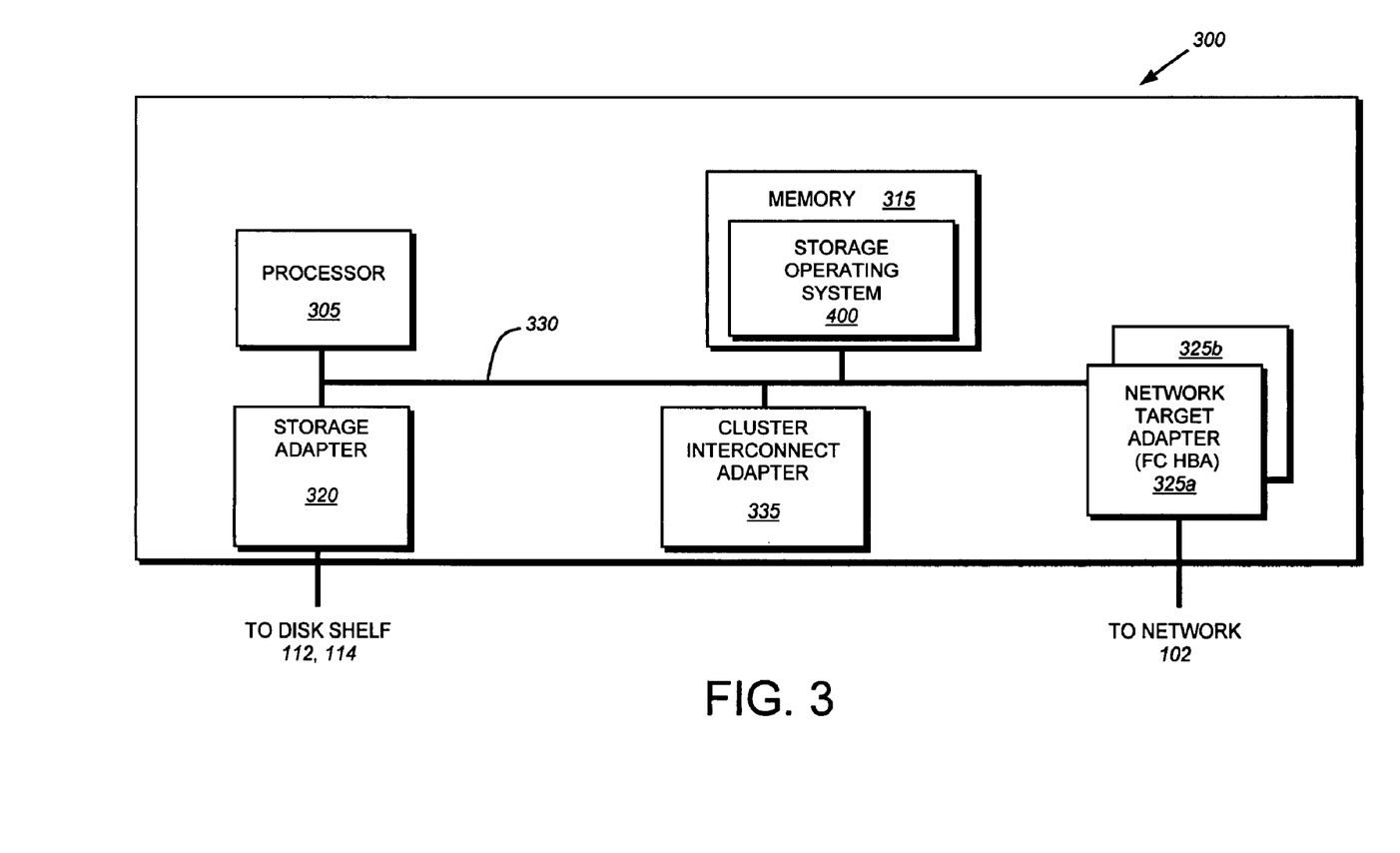
FIG. 3 is a schematic block diagram of an exemplary storage system in accordance with an embodiment of the present invention.

FIG. 3 is a schematic block diagram of an exemplary storage system 300 configured to provide storage service relating to the organization of information on storage devices, such as disks. The storage system 300 is illustratively embodied as a storage appliance comprising a processor 305, a memory 315, a plurality of network adapters 325a, 325b, a storage adapter 320 and a cluster interconnect adapter 335 interconnected by a system bus 330. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. An example of such a storage appliance is further described in the above-referenced U.S. Pat. No. 7,873,700, issued on Jan. 18, 2011, entitled MULTI-PROTOCOL STORAGE APPLIANCE THAT PROVIDES INTEGRATED SUPPORT FOR FILE AND BLOCK ACCESS PROTOCOLS. Note that the terms "storage system" and "storage appliance" are used interchangeably. The storage appliance 300 also includes a storage operating system 400 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage appliance 300 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. Pat. No. 7,107,385, issued on Sep. 12, 2006, entitled STORAGE VIRTUALIZATION BY LAYERING VIRTUAL DISK OBJECTS ON A FILE SYSTEM, by Vijayan Rajan, et al. The multi-protocol storage appliance thereafter makes these emulated disks accessible to the SAN clients through controlled exports, as described further herein.

In the illustrative embodiment, the memory 315 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the storage appliance by, inter alfa, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 325a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 325 a, b also couple the storage appliance 300 to a plurality of clients 104 that may be further configured to access the stored information as blocks or disks. The network adapters 325 may comprise a FC host bus adapter (HBA) having the mechanical, electrical and signaling circuitry needed to connect the storage appliance 300 to the network 102. In addition to providing FC access, the FC HBA may offload FC network processing operations from the storage appliance's processor 305. The FC HBAs 325 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 300.

The appliance 300 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 300) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 320 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 305 (or the adapter 320 itself) prior to being forwarded over the system bus 330 to the network adapters 325a and b, where the information is formatted into packets or messages and returned to the clients.

Storage of information on the storage appliance 300 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed.

Figure 4:
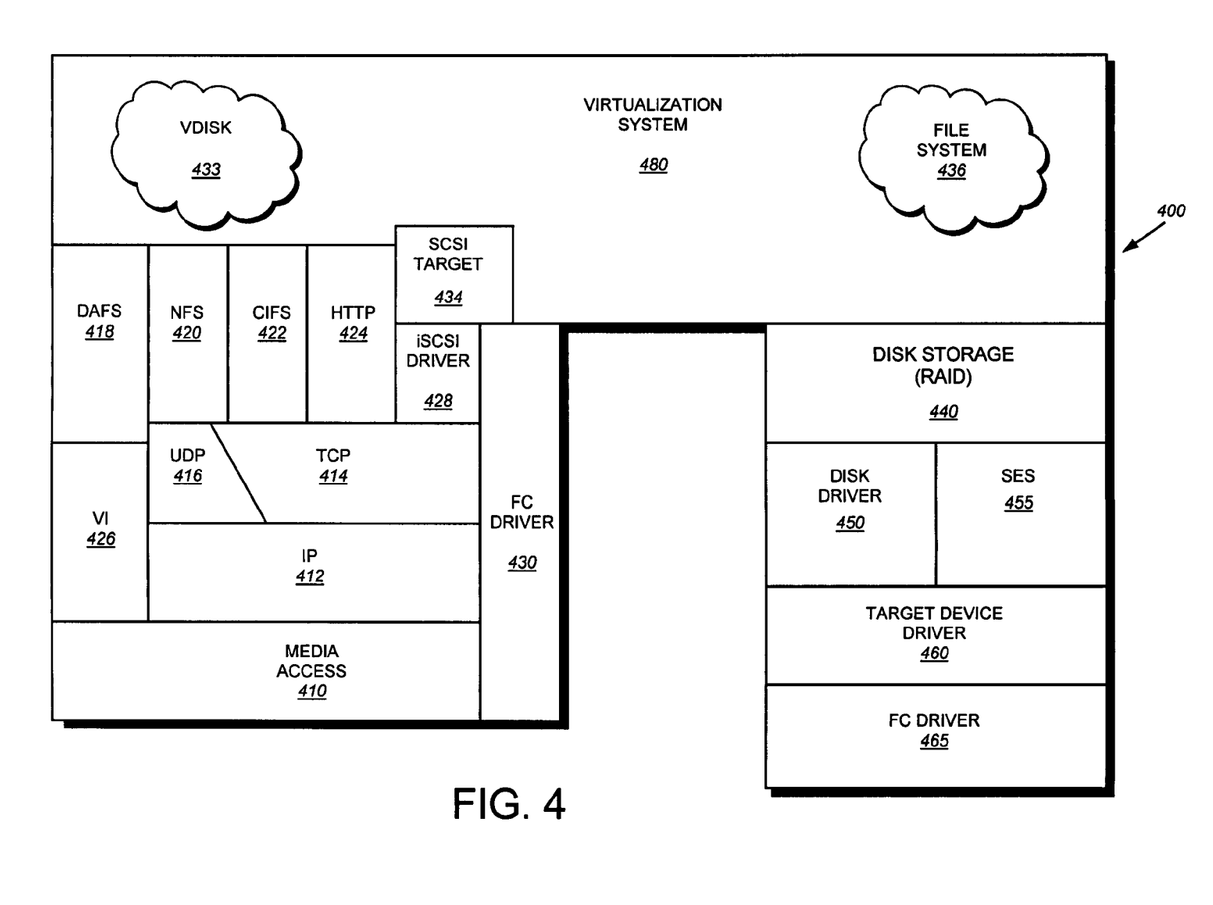
FIG. 4 is a schematic block diagram of an exemplary storage operating system in accordance with an embodiment of the present invention.

To facilitate access to the disks, the storage operating system 400 implements a write-anywhere file system that cooperates with novel virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate file system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

FIG. 4 is a schematic block diagram of the storage operating system 400 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the Direct Access File System (DAFS) protocol 418, the NFS is protocol 420, the CIFS protocol 422 and the Hypertext Transfer Protocol (HTTP) protocol 424. A Virtual Interface (VI) layer 426 implements the VI architecture to provide direct access transport (DAT) capabilities, such as Remote Direct Memory Access (RDMA), as required by the DAFS protocol 418.

An iSCSI driver layer 428 provides block protocol access over the TCP/IP network protocol layers, while a FC driver layer 430 operates with the FC HBA 325 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 440 that implements a disk storage protocol, such as a RAID protocol, and a disk driver layer 450 that implements a disk access protocol such as, e.g., a SCSI protocol.

A SCSI enclosure services (SES) module 455 operates in conjunction with the disk driver layer 450 to implement SES for the storage operating system 400. The SES module 455 utilizes a novel target device driver (TDD) module 460 to process incoming SES messages from other storage systems. As described further below, incoming SES messages are received by the TDD 460 and the de-encapsulated SES message is forwarded to the SES module 455 for processing. Responses are sent from the SES module 455 to the TDD module 460 to be forwarded to the initiator via the FC driver 465. In the illustrative embodiment, the FC driver module 465 controls the storage adapter 320.

Bridging the disk software layers with the integrated network protocol stack layers is a virtualization system 480 that is implemented by a file system 436 interacting with virtualization software embodied as, e.g., vdisk module 433, and SCSI target module 434. These modules may be implemented as software, hardware, firmware or a combination thereof. The vdisk module 433 manages SAN deployments by, among other things, implementing a comprehensive set of vdisk (lun) commands that are converted to primitive file system operations ("primitives") that interact with the file system 436 and the SCSI target module 434 to implement the vdisks.

The SCSI target module 434, in turn, initiates emulation of a disk or lun by providing a mapping procedure that translates luns into the special vdisk file types. The SCSI target module is illustratively disposed between the FC and iSCSI drivers 428, 430 and the file system 436 to thereby provide a translation layer of the virtualization system 480 between the SAN block (lun) space and the file system space, where luns are represented as vdisks. By "disposing" SAN virtualization over the file system 436, the multi-protocol storage appliance reverses the approaches taken by prior systems to thereby provide a single unified storage platform for essentially all storage access protocols.

The file system 436 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

D. Distributing SCSI Enclosure Services Information

The present invention overcomes the disadvantages of the prior art by providing a system and method for coordinating shared SCSI enclosure services (SES) information among a plurality of storage systems. Storage systems, which are interconnected with a series of intermediate network devices, such as hubs, between the storage systems and disk shelves, include a novel target device driver (TDD) module within a storage operating system. The TDD permits each storage system to function as a SCSI target and thereby receive and process commands directed to it from the other storage systems over the shared back end storage network. In the illustrative embodiment, a plurality of storage systems are operatively interconnected with a plurality of hubs or other intermediate network devices, which are, in turn, operatively interconnected with one or more disk shelves. During system initialization, each storage system determines the shelves for which it is an SES master by first determining the disks it owns, which may be accomplished using conventional disk ownership techniques. If it owns a SES disk, the storage system is one of the SES masters for the shelf containing the disk. The storage system then communicates with the other storage systems using SES messages to determine the SES masters of the other disks shelves on which it owns disks. Specifically, the SES module of this storage system communicates, via the TDD with a SES module of the other storage operating system to coordinate the SES information among the various storage systems. When requiring information on a disk shelf for which it is not the master, the storage system may transmit an SES message directed to one of the SES masters of the appropriate disk shelf. The SES message is received by the TDD at the SES master storage system, and forwarded to the SES module for processing.

Thus, the storage systems may coordinate SES information amongst themselves by sending appropriate messages (requests) to SES masters. In effect, a back end storage network interconnecting the storage systems, intermediate network devices and disks is utilized as an N-way interconnect among the storage systems.

Figure 5:
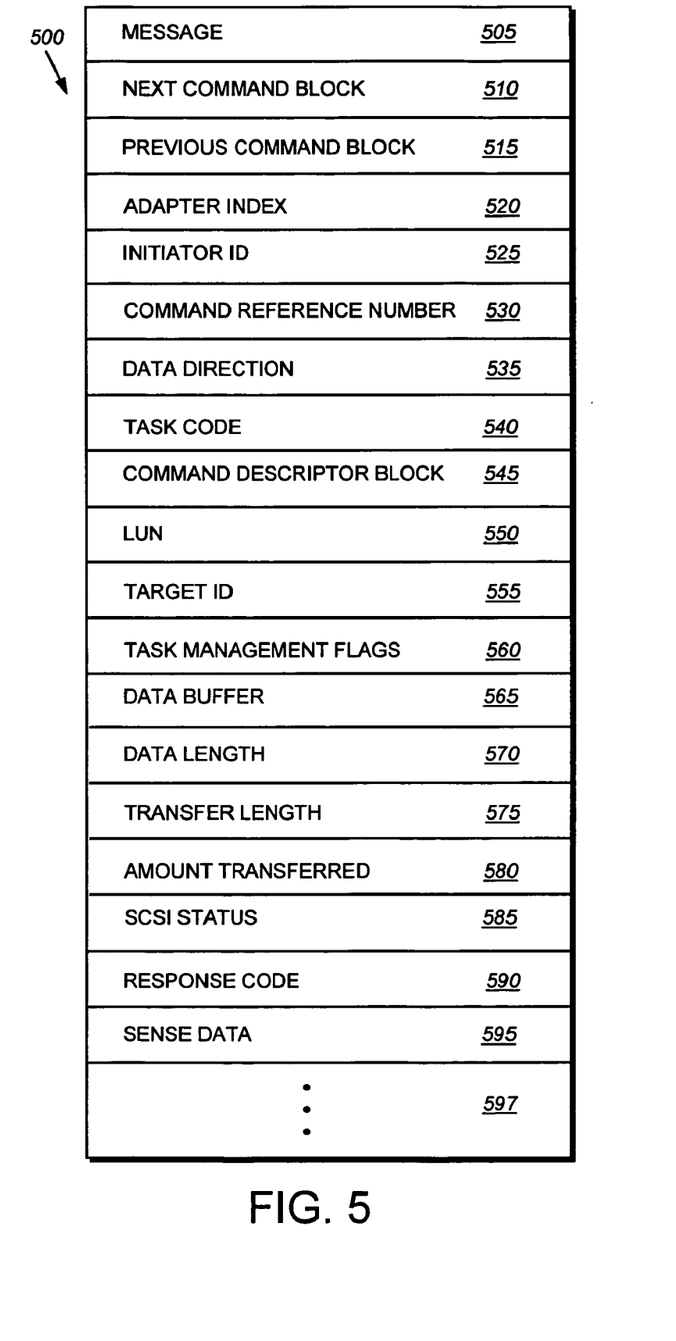
FIG. 5 is a schematic block diagram of an exemplary command block data structure in accordance with an embodiment of the present invention.

In accordance with the illustrative embodiment, a common command block is utilized to transfer information among the various modules of the storage operating system. That is, the common command block is used to communicate between the TDD module 460 and the SES module 450. FIG. 5 is a schematic block diagram of a command block 500 in accordance with embodiment of the present invention. The command block 500 includes a message field 505, a next command block field 510, a previous command block field 515, an adapter index field 520, an initiator ID field 525, a command reference number field 530, a data direction field 535, a task code field 540, a command descriptor block field 545, a lun field 550, a target ID field 555, a task management flags field 560, a data buffer field 565, a data length field 570, a transfer length field 575, an amount transferred field 580, a SCSI status field 585, a response code field 590, a sense data field 595, and in alternate embodiments, additional fields 597. The message field 505 includes the message associated with the entire command block 500. This message may be one of a plurality of types depending on the desired operation.

The next and previous command block fields 510, 515 are utilized by the target device driver 460 to generate linked lists of messages for use in processing a plurality received or transmitted messages. The adapter index field 520 contains an index value of the particular adapter associated with the command block 500. The adapter index field 520 is utilized to track the continuation of messages into and the completion of messages to the adapter that provided a particular request. The initiator ID field 525 contains a loop FC ID of the initiator that provided the request. The command reference number field 530 includes a number for the command reinforced by the block 500. This reference number may be utilized for tracking a plurality of interrelated commands to ensure that they are executed in the proper order. The data direction field 535 provides an indication of the direction of data flow for the referenced command with respect to inventor's perspective. For example, a value of "IN" indicates that data flows to the initiator, whereas a value of "OUT" indicates that the data flows from the initiator.

The task code field 540 identifies a type of queuing to be performed for this command. The command descriptor block field 545 includes a conventional SCSI command block associated with the referenced command. The LUN field 550 identifies a target LUN of the command and the target ID field 555 contains the loop ID of the target. The task management flags field 560 contains private flags utilized by the target device driver to control the command block. The data buffer field 565 contains a pointer that references an allocated data buffer for the command block. The data length field 570 identifies the length of the allocated buffer referenced by the data buffer field 565. The transfer length field 575 contains a length value of the data transfer for the referenced command. This length value may not be greater than the value of the data length field 570. In the illustrative embodiment the SES module sets the length values this for all commands that it processes to inform the target device driver of exactly how many bytes are. The amount transferred field 580 is utilized by the target device driver to track the total amount of data transferred. The SCSI status field 585 contains the value of a status field of a conventional FCP response. The response code field 590 is utilized to report overrun or under run conditions, while the sense data field 595 contains a conventional SCSI sense code for the referenced command.

Figure 6:
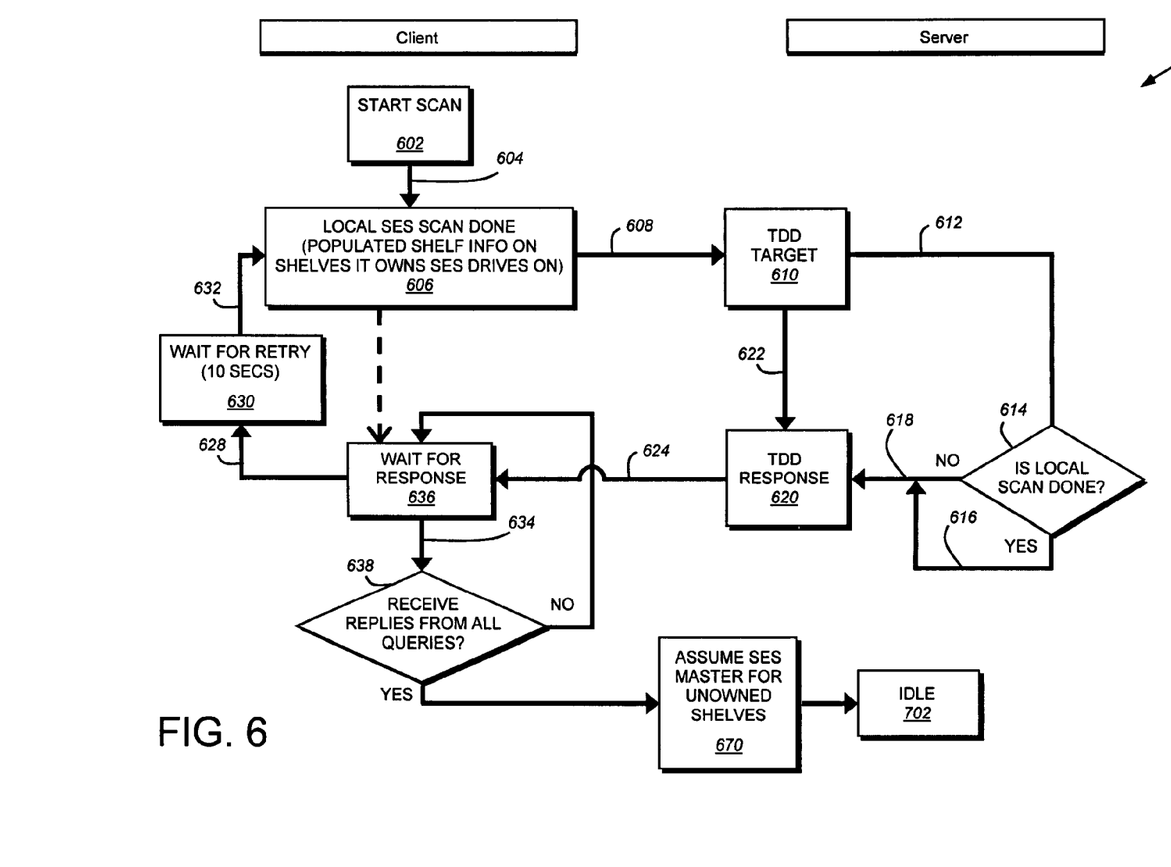
FIG. 6 is an exemplary state diagram showing interactive states of a storage system environment in accordance with an embodiment of the present invention.
Figure 7:
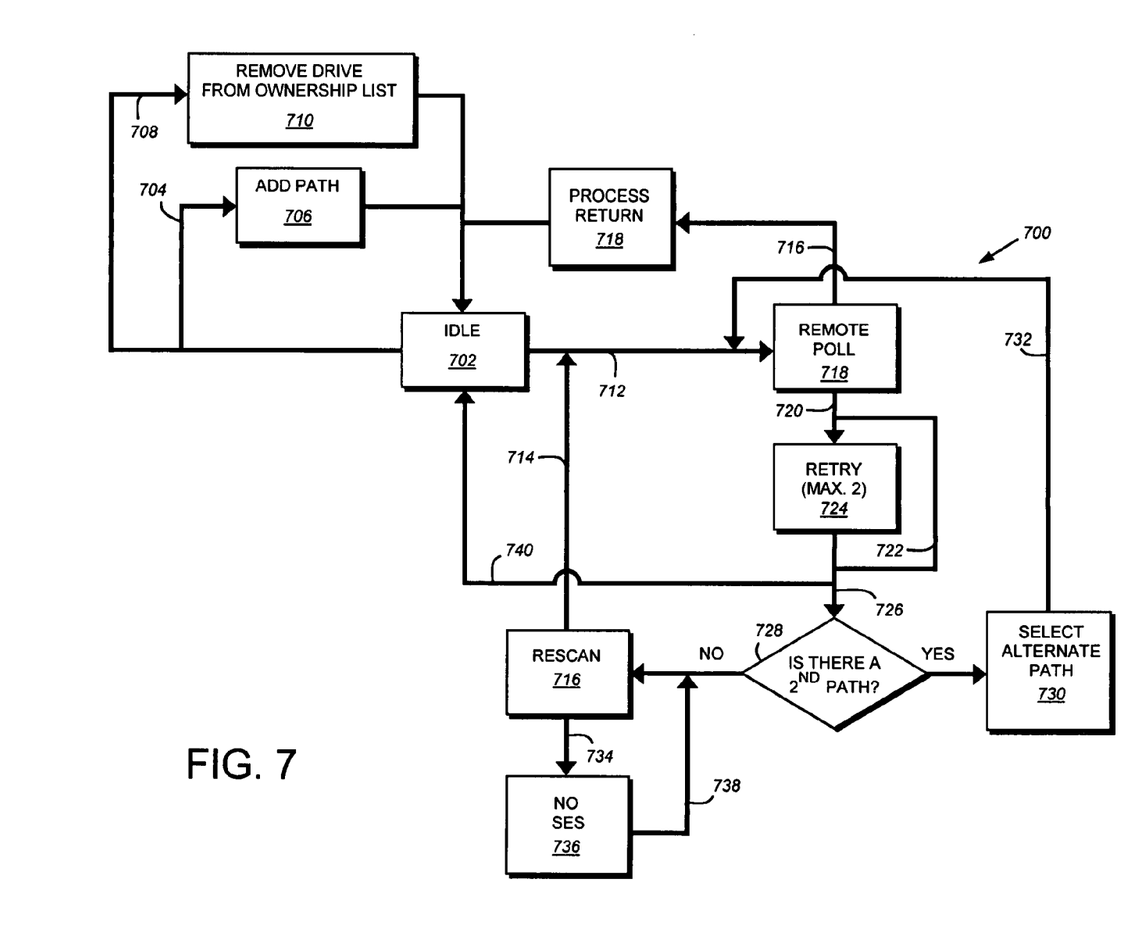
FIG. 7 is a state diagram showing states for an SES client in accordance with an embodiment of the present invention.
Figure 8:
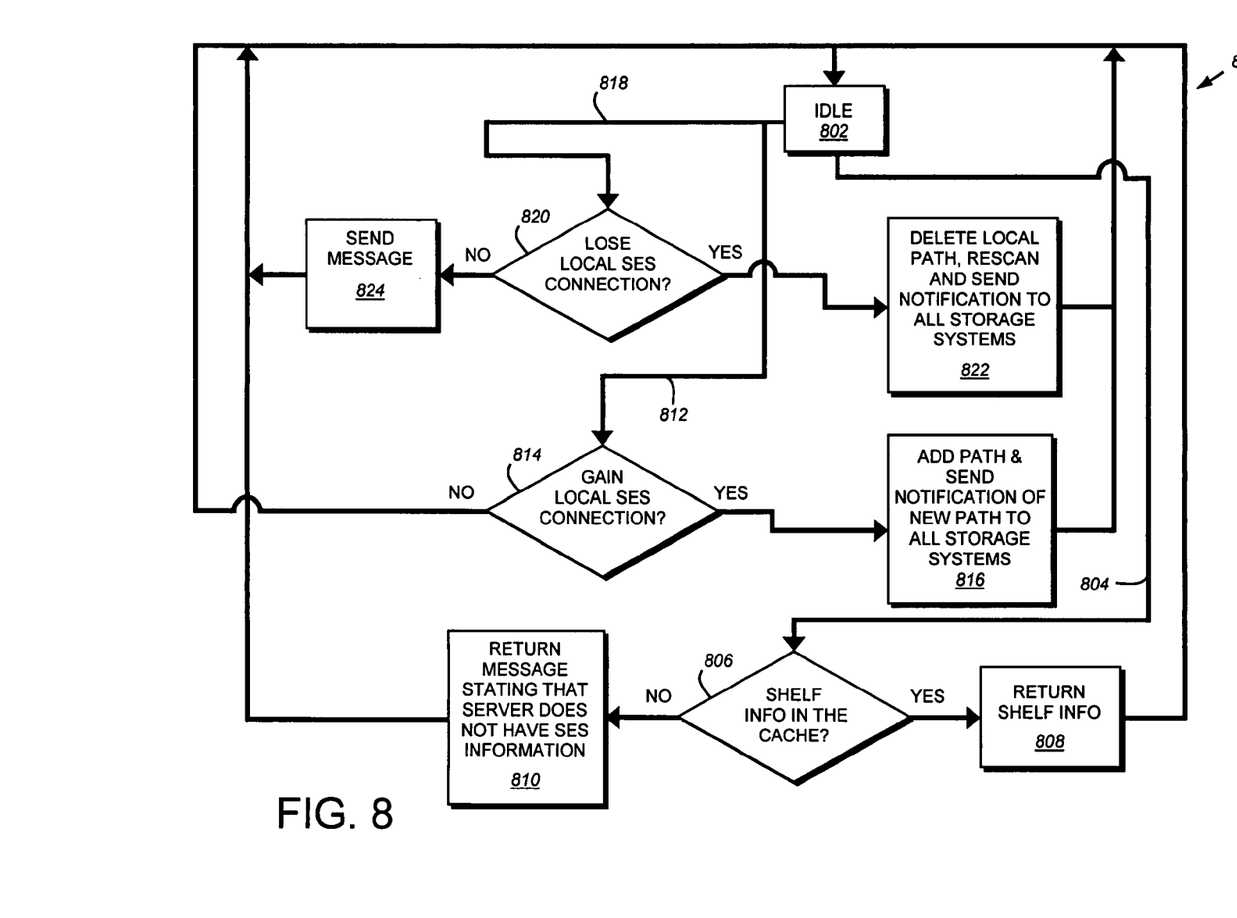
FIG. 8 is a state diagram showing states of an SES server in accordance with an embodiment of the present invention.

In accordance with the illustrative embodiment, each storage system determines disk ownership in accordance with a disk ownership protocol. One such disk ownership protocol is described in U.S. Pat. No. 7,650,412, issued on Jan. 19, 2010, entitled SYSTEM AND METHOD OF IMPLEMENTING DISK OWNERSHIP IN NETWORKED STORAGE, by Susan M. Coatney, et al. Each storage system that owns one of the disks located in a SES slot on a disk shelf is a SES master of that disk shelf and distributes information to the other storage systems in the network. Non-master storage systems, which may still own a disk in an SES shelf, may transmit a SES message directed to a SES master for processing by the SES master's SES modules. FIGS. 6-8 are state diagrams of various states that a storage system may enter in accordance with an embodiment of the present invention.

FIG. 6 is a state diagram 600 illustrating interactive states for performing initialization of a storage system environment between storage systems and SES devices in accordance with an embodiment of the present invention. The state diagram 600 may be applicable to each storage system in the storage system environment which is illustratively configured as a client/server environment. As used herein, the term "client" refers to the storage system requesting SES information and the term "server" refers to any other storage system from which a client obtains SES information. Moreover, the term "SES device" refers to any device that can send or receive SES commands or functions. As can be appreciated, a storage system is both a client with relation to obtaining SES information from other storage systems and a server with respect to distributing its own SES information to other storage systems. The client initially starts a scan of SES shelves in state 602 in response to, e.g., initialization (booting) of the storage system by an administrator-initiated command. This scan is performed using conventional SES scanning operations. The client then performs a local SES scan during transition 604 to state 606 where the local scan completes once the storage system has acquired shelf information on those SES shelves for which it owns SES drives, i.e., for which it is one of the SES masters.

It should be noted that the storage system has not obtained any SES information on shelves for which it is not a SES master even though it may own disks on those shelves. To obtain such SES information, the storage system functions as a client to request the information from one or more storage systems functioning as servers. To that end, the client queries one or more SES servers, via transition 608, by issuing a SES message request to the target device driver module 610 of the server. As in the case of the client, the server also initially scans SES shelves to acquire SES information for which it owns SES drives. If its SES initialization has completed, the server transitions, via trans-fer 612, to state 614 where a determination is made as to whether a local scan of the server has completed. If so, the server prepares, via figuration 616, the appropriate SES configuration data before moving to state 620 where the TDD issues a response, containing the SES configuration data via transfer 624 to the client. Meanwhile, the client has transitioned to state 636 to await the response to its request.

Upon receiving the server's response, the client moves via transition 634, populates its local SES information with the configuration data before moving to state 638 where a determination is made as to whether the client has received replies from all outstanding queries. If so, the client then transitions to state 670, where, if the client has the lowest WWN among all of the storage systems in the environment, the client assumes the role of SES master for any unowned disk shelves, i.e., shelves where the drives in the SES slots are not currently owned by an operating storage system (or not owned by any storage system). It should be noted that in alternate embodiments, the client with the highest WWN can assume this role, or more generally, any predefined arrangement for selecting the SES master for unowned disk shelves may be utilized with the teachings of the present invention. The client then transitions to an idle state 702.

If replies have not been received from all outstanding queries in state 638, the client returns to state 636 and waits for responses from those outstanding queries. If, in the waiting state 636 a response is received from a server reporting that it is not ready, the client transitions, via transition 628, to state 630 where it waits a predetermined amount of time. In the illustrative embodiment, the predetermined amount of time is a 10 second period before a timeout occurs (transition 632) and the client moves to state 606 to issue additional queries via transition 608.

Eventually, the client reaches an idle state 702, where it has acquired SES information from both disk shelves for which it is the master and disk shelves for which it is not the master. At idle state 702, the client thus has a baseline view of the SES configuration of the storage system environment, which may change over time with dynamic changes to the environment.

FIG. 7 is a state diagram illustratively states a SES client in accordance with an embodiment of the present invention. The client initially operates in an idle state 702, which is the end result of the scan/rescan state diagram 600 of to FIG. 6. In response to receiving a message to add a SES path, i.e., a new path to a SES shelve has been broadcast (transition 704), the client adds the path to its internal path list in state 706 before returning to idle state 702. Similarly, upon receiving a disk drive removal message (transition 708), the client removes the drive from its ownership list in state 710 before returning to the idle state 702. The drive removal message may originate from conventional FC operations such as a loop initialization event when a disk drive is physically removed from a FC loop.

If a periodic time out occurs (via transition 712), from idle state 702 the client transitions to state 718 where a "remote poll" occurs. Here, the client polls each of the servers known to it for updates to the SES information. Upon receiving updated SES information (transition 716), the client processes the received information in state 718 before returning to the idle state 702. If an error condition occurs during remote polling (transition 720), the poll is retried in state 724 up to a predefined maximum number of times. In the exemplary embodiment this maximum number of retried operations is two. If the retried operation(s) is successful, the client transitions (via transition 740) back to the idle state 702. If the retry fails (transition 726) the client transitions to state 728 where it determines whether there is a second path to the SES information. The second (or alternate) path to SES info may be represented by the fact that a SES disk shelf has two different SES masters, i.e., two different servers own the SES disks on the disk shelf. If a second path does exist, the client selects the alternate path to obtain the info in state 730 and then utilizes the new path through remote repolling in state 718. If there is no second path (state 728), the client transitions to a rescan state 716. If a new SES path is found during rescan the client (via transition 714) performs a new remote poll in state 718. If, during the rescan operation in state 716 no path is found, the client transitions (via transition 734) to state 736 where no SES information is available. The client then periodically transitions to the rescan state 716 (via transition 738) in an attempt to reestablish SES info update.

FIG. 8 is a state diagram 800 illustratively states if a SES server in accordance with an embodiment of the present invention. The server initially operates in an idle state 802. In response to receiving a query (transition 804) from a client, the server determines if there is appropriate SES information shelf info in its cache in state 806. If so, the server responds with the SES shelf information in state 808 before returning to the idle state 802. Alternately, it is determined that there is no shelf information, the server responds with a message stating that it does not have the requested SES information in state 810 before returning to the idle state 802.

If, during idle state 802, a drive is inserted (transition 812) into the storage system environment so that the server is the disk owner, the server transitions to state 814 where it determines if it gained a local SES connection. Drive insertion may occur as the result of a physical drive insertion or a disk ownership change so that the server acquires ownership of a disk. If it did not gain a local SES connection in state 806, the server transitions back to the idle state 802. However, if it did gain a new local SES connection, the server transitions to state 816 where it adds the appropriate path to its ownership records and sends an SES message to all storage systems notifying them that the server has a new SES path before transitioning back to the idle state 802.

Finally, from the idle state 802 the server may transition (via transition 818) to state 820 to determine if it has lost a local SES connection. Transition 818 may occur if a drive is removed, a disk fails or if the disk ownership is changed so that the server no longer owns a disk. If it has not lost a local SES connection, the server transitions to state 824 and sends a message to the owner to inform the owner that no SES connection has been lost before returning to the idle state 802. However, if a local SES connection has been lost, the server transitions to state 822 and deletes the local path from its SES information. The server also performs a rescan operation and sends a SES message to all storage systems informing them that it no longer has a path to the disk before returning the idle state 802.

As can be appreciated by one skilled in the art, the various storage systems in a storage system environment may undergo the various states shown in FIGS. 6-8 simultaneously with respect to being a client and a server at the same time. Additionally in a environment with more than two storage systems, a particular storage system may function as a client to more than one storage system and may be in different states with respect to a given storage system or systems. Similarly, storage systems may be in various server states with respect to a plurality of clients. The present invention permits the rapid dissemination of SES information among the various storage systems in a storage system environment using the novel target device driver to permit communication among the storage systems using the back-end storage network comprising interconnected by the intermediate network devices the storage systems and disk shelves. As can be appreciated, the present invention may be modified to utilize any non-SES message format without departing from the spirit or scope of the present invention.

To again summarize, the present invention is directed to a system and method for distributing SES information among a plurality of storage systems in a room network. Storage systems that own one of the disks in a SES slot of a shelf are SES masters of that shelf and may modify SES information and serve as servers to other storage systems in the network. During system initialization, a storage system determines those disks that it owns using a conventional disk ownership protocol and then determines those shelves that it does not own. A storage system may, in conjunction with its SES and TDD modules, communicate with other storage systems in the network to share SES information. Notably, the present invention utilizes a shared back end storage network to enable N-way communication among the storage systems.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for sharing enclosure services information among a plurality of storage systems, comprising:
    configuring each storage system of the plurality of storage systems with a network adapter for communication with a plurality of clients, and configuring each storage system with a storage adapter for communication with a plurality of disk shelves, each disk shelf of the plurality of disk shelves containing one or more storage devices;
    operatively connecting an intermediate network device to each storage system through the storage adapter of each storage system, and operatively connecting the intermediate network device to the plurality of disk shelves;
    configuring the storage adapter of each storage system to have a target device driver (TDD) to function as a SCSI target to receive a command from other storage systems of the plurality of storage systems after forwarding of the command by the intermediate network device;
    passing the received command by the TDD to a SCSI enclosure services (SES) module of an operating system of a receiving storage system of the plurality of storage systems;
    transmitting a command requesting enclosure services information of a selected disk shelf of the plurality of disk shelves by a first SES module of a first storage system of the plurality of storage systems, the command addressed to a second storage system of the plurality of storage systems, where the second storage system is a master storage system of the selected disk shelf;
    forwarding the command by the intermediate network device to a TDD of the second storage system, and receiving the command by a second SES module of the second storage system;
    in response to receiving the command, sending by the second SES module of the second storage system a response with the requested enclosure services information to the first storage system, the response forwarded by the intermediate network device to the first storage system;
    receiving the response by the first storage system; and
    entering an idle state by the first storage system after receiving the response having the requested enclosure services information.

2. The method of claim 1, wherein
    the enclosure services information comprises SCSI enclosure services information.

3. The method of claim 1 further comprising:
    removing a drive from an ownership list in response to receiving a drive removal message.

4. The method of claim 1 further comprising:
    polling at least one storage device of the plurality of storage devices for updated enclosure services information.

5. The method of claim 1 further comprising:
    determining if a local enclosure services connection has been lost in response to receiving a drive removal message.

6. The method of claim 5 further comprising:
    sending a notification to at least one storage system of the plurality of storage systems in response to determining that the local enclosure services connection has been lost.

7. The method of claim 1 further comprising:
    determining if a local enclosure services connection has been gained in response to receiving a drive addition message.

8. The method of claim 7 further comprising:
    sending a notification to at least one storage system of the plurality of storage systems in response to determining that the local enclosure services connection has been gained.

9. A non-transitory computer readable storage media, comprising:
    said computer readable storage media containing program instructions for execution on a processor for a method of sharing enclosure services information among a plurality of storage systems, the program instructions for, configuring each storage system of the plurality of storage systems with a network adapter for communication with a plurality of clients, and configuring each storage system with a storage adapter to communicate with a plurality of disk shelves, each disk shelf of the plurality of disk shelves containing one or more storage devices;
    operatively connecting an intermediate network device to each storage system through the storage adapter of each storage system, and operatively connecting the intermediate network device to the plurality of disk shelves;
    configuring the storage adapter of each storage system to have a target device driver (TDD) to function as a SCSI target to receive a command from other storage systems of the plurality of storage systems after forwarding of the command by the intermediate network device;

passing the received command by the TDD to a SCSI enclosure services (SES) module of an operating system of a receiving storage system of the plurality of storage systems;

transmitting a command requesting enclosure services information of a selected disk shelf of the plurality of disk shelves by a first SES module of a first storage system of the plurality of storage systems, the command addressed to a second storage system of the plurality of storage systems, where the second storage system is a master storage system of the selected disk shelf;

forwarding the command by the intermediate network device to a TDD of the second storage system, and receiving the command by a second SES module of the second storage system;

in response to receiving the command, sending by the second SES module of the second storage system a response with the requested enclosure services information to the first storage system, the response forwarded by the intermediate network device to the first storage system;

receiving the response by the first storage system; and entering an idle state by the first storage system after receiving the response having the requested enclosure services information.

10. A system for sharing enclosure services information among a plurality of storage systems, comprising:

each storage system of the plurality of storage systems configured with a network adapter to communicate with a plurality of clients, and configured with a storage adapter to communicate with a plurality of disk shelves, each disk shelf of the plurality of disk shelves containing one or more storage devices;

an intermediate network device operatively connected to each storage system through the storage adapter of each storage system, and the intermediate network device operatively connected to the plurality of disk shelves;

the storage adapter of each storage system configured to have a target device driver (TDD) to function as a SCSI target to receive a command from other storage systems of the plurality of storage systems after forwarding of the command by the intermediate network device;

the storage adapter configured to pass the received command by the TDD to a SCSI enclosure services (SES) module of an operating system of a receiving storage system of the plurality of storage systems;

a first storage system of the plurality of storage systems configured to transmit a command from a first SES module requesting enclosure services information of a selected disk shelf of the plurality of disk shelves, the command addressed to a second storage system of the plurality of storage systems, where the second storage system is a master storage system of the selected disk shelf;

the intermediate network device configured to forward the command to a receiving TDD of the second storage system, and a second SES module of the second storage system configured to receive the command from the receiving TDD;

the second SES module of the second storage system configured to send, in response to receiving the command, a response with the requested enclosure services information to the first storage system, the response forwarded by the intermediate network device to the first storage system;

the first storage system further configured to receive the response; and the first storage system further configured to enter an idle state after receiving the response having the requested enclosure services information.

11. The system of claim 10, wherein the enclosure services information comprises SCSI enclosure services information.

12. The system of claim 10, further comprising:

each target device driver of a selected storage system of the plurality of storage systems configured to communicate with an enclosure services module of the selected storage system using a command block.

13. The system of claim 10, wherein the storage device comprises a disk drive.

14. A method for passing commands among a plurality of storage systems, comprising:

configuring each storage system of the plurality of storage systems with a network adapter for communication with a plurality of clients, and configuring each storage system with a storage adapter for communication with a plurality of disk shelves, each disk shelf of the plurality of disk shelves containing one or more storage devices;

operatively connecting an intermediate network device to each storage system through the storage adapter of each storage system, and operatively connecting the intermediate network device to the plurality of disk shelves;

configuring the storage adapter of each storage system to have a target device driver (TDD) to function as a SCSI target to receive a command from other storage systems of the plurality of storage systems after forwarding of the command by the intermediate network device;

passing the received command by the TDD to a SCSI enclosure services (SES) module of an operating system of a receiving storage system of the plurality of storage systems; and responding to the command by the operating system of the receiving storage system.

15. A system configured to pass commands between a plurality of storage systems, comprising:

each storage system of the plurality of storage systems configured with a network adapter to communicate with a plurality of clients, each storage system further configured with a storage adapter to communicate with a plurality of disk shelves, each disk shelf of the plurality of disk shelves containing one or more storage devices;

an intermediate network device operatively connected to each storage system through the storage adapter of each storage system, the intermediate network device operatively connected to the plurality of disk shelves;

the storage adapter of each storage system configured to have a target device driver (TDD) to function as a SCSI target to receive a command from a transmitting storage system of the plurality of storage systems after forwarding of the command by the intermediate network device;

the storage adapter further configured to pass the received command by the TDD to a SCSI enclosure services (SES) module of an operating system of a receiving storage system of the plurality of storage systems; and the receiving storage system configured to respond to the command by the operating system transmitting a response to the transmitting storage system.

* * * * *